(12) United States Patent
Altun et al.

(10) Patent No.: US 11,683,168 B2
(45) Date of Patent: Jun. 20, 2023

(54) SYSTEMS AND METHODS FOR GENERATING SHARED KEYS, IDENTITY AUTHENTICATION AND DATA TRANSMISSION BASED ON SIMULTANEOUS TRANSMISSION ON WIRELESS MULTIPLE-ACCESS CHANNELS

(71) Applicant: ISTANBUL TEKNIK UNIVERSITESI, Istanbul (TR)

(72) Inventors: Ufuk Altun, Istanbul (TR); Semiha Tedik Basaran, Istanbul (TR); Gunes Zeynep Karabulut Kurt, Istanbul (TR); Enver Ozdemir, Istanbul (TR)

(73) Assignee: ISTANBUL TEKNIK UNIVERSITES!, Istanbul (TR)

( * ) Notice: Subject to any disclaimer, the term of this patent is extended or adjusted under 35 U.S.C. 154(b) by 149 days.

(21) Appl. No.: 17/265,521

(22) PCT Filed: Jul. 3, 2019

(86) PCT No.: PCT/TR2019/050524
§ 371 (c)(1),
(2) Date: Feb. 3, 2021

(87) PCT Pub. No.: WO2020/027758
PCT Pub. Date: Feb. 6, 2020

(65) Prior Publication Data
US 2021/0226784 A1 Jul. 22, 2021

(51) Int. Cl.
*H04L 25/02* (2006.01)
*H04L 9/08* (2006.01)
*H04W 56/00* (2009.01)

(52) U.S. Cl.
CPC ............ *H04L 9/0875* (2013.01); *H04L 9/085* (2013.01); *H04L 25/024* (2013.01); *H04W 56/001* (2013.01); *H04L 2209/80* (2013.01)

(58) Field of Classification Search
CPC ..... H04L 9/0875; H04L 9/085; H04L 25/024; H04L 2209/80; H04W 56/001
See application file for complete search history.

(56) References Cited

U.S. PATENT DOCUMENTS

| 4,405,829 A | 9/1983 | Rivest et al. |
| 5,369,705 A | 11/1994 | Bird et al. |

(Continued)

FOREIGN PATENT DOCUMENTS

WO 2007124054 A2 11/2007

OTHER PUBLICATIONS

Bobak Nazer, et al., Computation over Multiple-Access Channels, IEEE Transactions on Information Theory, 2007, pp. 3498-3516, vol. 53, No. 10.

(Continued)

*Primary Examiner* — Ashokkumar B Patel
*Assistant Examiner* — William B Jones
(74) *Attorney, Agent, or Firm* — Bayramoglu Law Offices LLC

(57) ABSTRACT

Methods of half-duplex communication systems or full-duplex communication systems are provided. The half-duplex communication system includes n number user units-including a transmitting unit of transmitting units, wherein the transmitting unit including a channel estimation module, an identity update module and a modulation module; a receiving unit of receiving units including a demodulation module, a post-processing module and a reconciliation and verification module; a memory unit for storing prime identities, data to be transmitted and shared secret key; a control unit; an antenna connected to each of the transmitting units and each of the receiving units; and the methods are used for realizing a generation of shared secret keys, and an integrated identity verification and a data transmission using the (Continued)

half-duplex communication systems and the full-duplex communication systems.

12 Claims, 7 Drawing Sheets

(56) References Cited

U.S. PATENT DOCUMENTS

| | | | |
|---|---|---|---|
| 5,708,714 | A | 1/1998 | Lopez et al. |
| 5,764,767 | A * | 6/1998 | Beimel .................. H04L 9/085 |
| | | | 713/180 |
| 6,078,809 | A | 6/2000 | Proctor |
| 6,243,811 | B1 | 6/2001 | Patel |
| 6,522,886 | B1 | 2/2003 | Youngs et al. |
| 6,681,017 | B1 * | 1/2004 | Matias .................. H04L 63/061 |
| | | | 380/278 |
| 6,697,947 | B1 | 2/2004 | Matyas, Jr. et al. |
| 7,218,739 | B2 | 5/2007 | Multerer et al. |
| 8,447,036 | B2 | 5/2013 | Jho et al. |
| 8,763,097 | B2 | 6/2014 | Bhatnagar et al. |
| 9,818,315 | B2 * | 11/2017 | Hiltunen .................. G09C 1/00 |
| 2005/0265550 | A1 * | 12/2005 | Tuyls .................. H04L 9/3218 |
| | | | 380/259 |
| 2007/0165845 | A1 | 7/2007 | Ye et al. |
| 2008/0086767 | A1 | 4/2008 | Kulkarni et al. |
| 2010/0317420 | A1 * | 12/2010 | Hoffberg ............ G06Q 30/0282 |
| | | | 463/1 |
| 2012/0106739 | A1 | 5/2012 | Ly et al. |
| 2013/0101121 | A1 | 4/2013 | Nordholt et al. |
| 2013/0173910 | A1 | 7/2013 | Hong et al. |
| 2013/0219164 | A1 | 8/2013 | Hamid |
| 2013/0262857 | A1 * | 10/2013 | Neuman ................ H04L 63/083 |
| | | | 713/155 |
| 2017/0338956 | A1 | 11/2017 | Badawy et al. |

OTHER PUBLICATIONS

Mario Goldenbaum, et al., Harnessing Interference for Analog Function Computation in Wireless Sensor Networks, IEEE Transactions on Signal Processing, 2013, pp. 4893-4906, vol. 61, No. 20.

Hongbo Liu, et al., Group Secret Key Generation via Received Signal Strength: Protocols, Achievable Rates, and Implementation, IEEE Transactions on Mobile Computing, 2013.

Ufuk Altun, et al., A Testbed based Verification of Joint Communication and Computation Systems, 25th Telecommunications Forum TELFOR, 2017.

* cited by examiner

SYSTEMS AND METHODS FOR GENERATING SHARED KEYS, IDENTITY AUTHENTICATION AND DATA TRANSMISSION BASED ON SIMULTANEOUS TRANSMISSION ON WIRELESS MULTIPLE-ACCESS CHANNELS

CROSS REFERENCE TO THE RELATED APPLICATIONS

This application is the national stage entry of International Application No. PCT/TR2019/050524, filed on Jul. 3, 2019, which is based upon and claims priority to Turkish Patent Application No. 2018/11274, filed on Aug. 3, 2018, the entire contents of which are incorporated herein by reference.

TECHNICAL FIELD

Security is one of the most cared for sub-topics of the present communications networks. Numerous methods against unauthorized usage of data or identity impersonation have been developed. Identity authentication, and communication with the help of secret shared keys are the commonly used and known methods which are used against these attacks. On the other hand, with the increase of the application areas of the internet of things, and the increase of the number of users thereof, the efficient use of resources has become one of the most cared for sub-topics. In the last fifteen years, in order to provide energy conservation on the sensors, a method for calculating the sensor data on the channel has been proposed.

The present invention relates to the subjects of shared key generation, secure authentication, encryption and on-channel calculation. In the proposed method, the users perform simultaneous transmissions on the wireless multiple access channel. Unique pre-processing and post-processing functions are used at the receiving and transmitting end-points within the users, and by the virtue of this, n number of users agree on a secret key in n number of rounds for half-duplex communication, and in one round for full-duplex communication. Additionally, using the half-duplex communication, authentication and/or data exchange can be carried out without using a key.

BACKGROUND

Producing of shared secret key, systems performing authentications and methods performing on-channel calculations are present in the literature independently from each other. In the state of the art, a method for on-channel function calculation without losing authentication data, or a method for generating a key or identity validation, which calculate a function by simultaneously using the communication channel, are not present.

Some of the works for identity validation, shared key generation and on-channel calculation in the literature are given as follows.

The method suggested in the U.S. Pat. No. 5,369,705A, provides a secure communication network between the parties using group key. The generation of the communication and group key between the parties is provided via peer-to-peer communication channels.

In the U.S. Pat. No. 6,078,809A, a method and hardware for providing communication between the parties is disclosed. The suggested method utilizes peer-to-peer communication channels.

In the U.S. Pat. No. 6,697,947B1, a system which utilizes biometric data for identity verification is disclosed, and the said system provides secure communication against impersonation attacks. The communication in this system is provided by peer-to-peer communication channels.

In the U.S. Pat. No. 7,218,739B2, a system which proposes identity verification for multiple users is disclosed, and the said system utilizes peer-to-peer communication channels.

In the U.S. Pat. No. 8,763,097B2, a system which verifies identity using secret key is disclosed, and the said system utilizes peer-to-peer communication channels.

In the United States patent document numbered US20050265550A1, a system and method comprising polynomial operations for secret key calculations are disclosed. In the said system, the identity verification operation is realized using way less energy compared to RSA methods. The said method utilizes peer-to-peer communication channels.

In the United States patent document numbered US20080086767A1, a secure method against impersonation attacks or against attack attempting to recover keys, by the method of transmitting the key used in the operation of identity verification, through multiple channels, is presented. The said system utilizes peer-to-peer communication channels.

In the United States patent document numbered US20130101121A1, secure communication via quantum key is proposed, and peer-to-peer communication channels are utilized.

In the United States patent document numbered US20130219164A1, a system which verifies identity with the help of cloud is disclosed, and the said system utilizes peer-to-peer communication channels.

In the United States patent document numbered US20130262857A1, a method for identity verification is proposed, and peer-to-peer communication channels are utilized for communication.

In the U.S. Pat. No. 4,405,829, a cryptographic communication system which utilizes prime numbers is proposed. The communication between the parties is provided by peer-to-peer communication channels.

In the United States patent document numbered US20130173910A1, a method suggesting discreet data sharing between the sensor nodes is proposed. The communication between the sensor nodes is provided by peer-to-peer communication channels.

In the United States patent document numbered US005764767A, a method for secret information sharing is proposed, and peer-to-peer communication channels are utilized for communication.

In the United States patent document numbered US006681017B1, a protocol for generating shared key is proposed. In this method, where the data is routed via the server, the communication is directly between the end-points.

In the United States patent document numbered US008447036B2, a key agreement method for multiple parties is suggested. The communication between the parties in the presented method is provided by peer-to-peer communication channels.

Identity verification, shared key generation and shared secret sharing methods, examples for which are given above, realize identity verification and data exchange over peer-to-peer communication channels, with the help of secret and/or shared keys. In this case, energy is spent both for generating and using the key, and for the transmitters to open communications to the receivers one by one. By the virtue of simultaneous communication, the energy burden on the transmitters and the receiver could be reduced.

In the U.S. Pat. No. 9,818,315B2, a key generation method for multiple parties is suggested. In the method, where the parties would use the sensor values in the environment in which they are present, for generating keys, there is no communication present between the parties for key generation.

In the U.S. Pat. No. 5,708,714A, a method for sharing confidential information inside the communication system is disclosed. The said system utilizes peer-to-peer communication channels and broadcast communications. No simultaneous broadcasting is present.

In the U.S. Pat. No. 6,243,811B1, a method realizing shared discreet data update over the wireless communication channel is proposed. The communication is provided by the broadcasting transmitters. As the broadcasts are not simultaneous, time is spent for the broadcast of each party.

In the U.S. Pat. No. 6,522,886B1, by the virtue of the method which assigns the same channel to multiple users when the necessary conditions are met, simultaneous communication is provided. The said system does not perform function calculations over the channel.

In an article [1] which suggests taking advantage of multiple access channel, calculating the mathematical operations over the channel by simultaneously using the wireless communication channel, is proposed. In the proposed method, the credentials are unreachable, however, the functions of the sent data reach the receiver.

In another article [2], calculating functions over the channel, operations executable over the multiple access channel, and the limits of these operations are researched, however, the credentials are unreachable.

The above methods which enables operations to be carried out over the multiple access channel could derive a benefit in energy and time, by transferring the processing load on the receiver to the channel. However, this method is applicable when only one function of the data to be sent is required, and the data itself need not be known. In other words, in order to save on energy and time, the transmitter might use the functions of the personal data to be sent instead of the data itself. By this way, the total transmission time is reduced, and the calculation is realized over the channel. However, personal data transmitted by each transmitter are not individually separated in the receiver.

RESOURCES

[1] B. Nazer and M. Gastpar, "Computation over multiple-access channels" IEEE Transactions on Information Theory, vol. 53, no. 10, pp. 3498-3516, 2007.
[2] M. Goldenbaum, H. Boche, and S. Stanczak, "Harnessing interference for analog function computation in wireless sensor networks" IEEE Transactions on Signal Processing, vol. 61, no. 20, pp. 4893-4906, 2013.

SUMMARY

The object of this invention is to provide methods for the users to generate shared secret keys, to verify identities or to exchange data in an efficient manner in terms of time and energy. In the provided method, similar to the usage in the present function calculation methods over the communication channel, the distorting effect that the communication channel has over the signals is taken advantage of. By the virtue of the channel and the pre-processing and the post-processing functions, the signals are significant only when they reach the receiving party. As a result, the usage of secret and/or shared keys for generating a shared key, and the presence of a trusted party is not required. By using the prime numbers inside these functions as well, n number of users could generate secret keys in n number of rounds in a half-duplex communication system, and in one round in a full-duplex communication system. By this way, the invention achieves efficiency and energy conservation on the users' part.

Another object of the invention is to provide a method which enables reaching the personal data on the receiving end and/or verify the identity of the said personal data, contrary to the conducted studies [1, 2] in which, the data wanted to be sent from n number of users to a single user in a half-duplex communication system is encrypted in the transmitting end, and the calculations are carried out in the classic channel. In addition to the above-mentioned shared key generation scheme, the desired data could also be engraved to the signals in the pre-processing function. By making use of the prime numbers, the data is encrypted in the transmitting end, and the receiver could reach the whole data by applying the post-processing function.

By the virtue of the distorting effect of the channel, which is made until by the proposed invention, and the simultaneous transmissions, the communication between the users is secure against attacks. An eavesdropper who eavesdrops the signals transmitted by the users cannot decrypt the signals which he gathers from the channel. For these reasons, the methods we propose provide a robust communications model against eavesdropping, to which the wireless channel communication is vulnerable. By this way, the proposed method transcends the present classical shared key generating methods in that it enables the key generation for n number of users in n number of rounds for half-duplex communication systems, and in one round for full-duplex communication systems. On the other hand, it is superior to the classical studies [1, 2] which perform calculations over multiple communication channels in that it both provides secure communications through identity verification and it the data could be acquired individually.

BRIEF DESCRIPTION OF THE DRAWINGS

The two systems, and the three methods in order to fulfill the objects of the present invention is illustrated in the attached figures, where.

Figure 1:
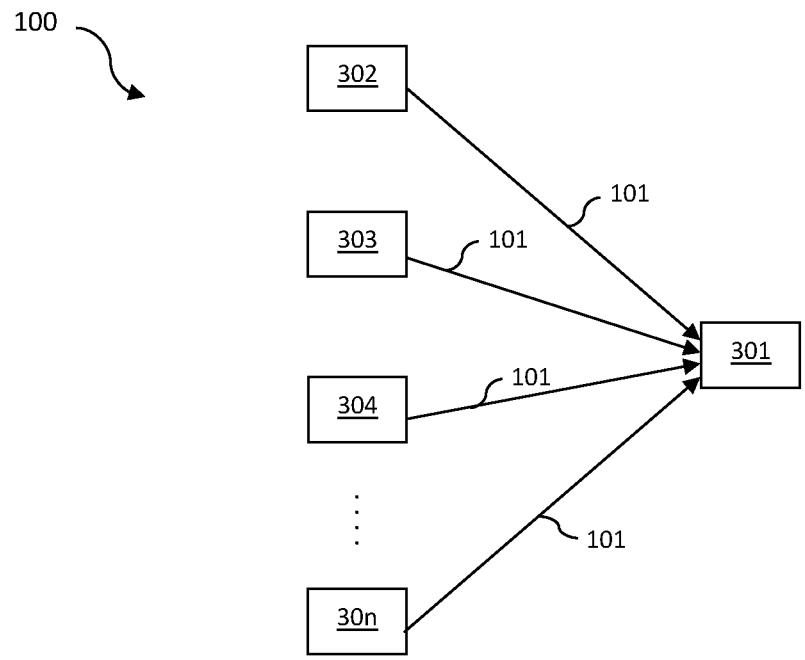
FIG. 1: Schematic view of the half-duplex communication system.

Elements shown in the figures are individually numbered, and the correspondence of these numbers are given as follows:
100. Half-duplex communication system
110. Channel coefficient
200. Full-duplex communication system
300, 301, 302, 303, 304, 30n. User unit
305. Memory unit
310. Control unit
320. Transmitting unit
325. Channel estimation module
330. Identity update module
335. Pre-processing module
340. Modulation module
350. Receiving unit
355. Demodulation module
360. Post-processing module
365. Reconciliation and verification module
380. Antenna

DETAILED DESCRIPTION OF THE EMBODIMENTS

The inventive half-duplex communication system (100) and the full-duplex communication system (200) which enable shared secret key generation or identity verification and data transmission on the wireless multiple access channel, essentially comprise multiple user units (300) each having one receiving unit (350) and one transmitting unit (32). Each of the said user units (300) comprises a memory unit (305) for storing the channel state information ($h_n$), prime identities ($p_n$), data to be transmitted ($A_n$) and the shared secret key (K); a control unit (310) for controlling the transmitting unit (320) and the receiving unit (350); and two antennas (380) connected to transmitting unit (320) and the receiving unit (350) for enabling wireless data communication.

Each said transmitting unit (32) comprises a channel estimation module (325) adapted to perform channel estimation (and to record the channel state information achieved as the result of the channel estimation operation in the memory unit (305)), an identity update module (330) adapted to apply identity update operation using the acquired channel state information, a pre-processing module (335) adapted to realize pre-processing using the data inside the memory unit (305), and a modulation module (340) adapted to modulate the output of the pre-processing module (335).

While each said receiving unit (350) comprises; a demodulation module (355) adapted to demodulate the wirelessly obtained signal (and to clear it from self-interference in full-duplex communication), a post-processing module (360) adapted to perform a post-process to the output of the demodulation module (355), and a reconciliation and verification module (365) adapted to perform reconciliation and verification operation to the output of the post-processing module (360).

In a preferred embodiment of the invention, a method for each user unit (300) to generate a shared secret key, over a multiple-communication channel via n number of communications, using the said half-duplex communication system (100) comprising n number of user units (300) having a memory unit, a control unit (310) connected to the memory unit (305), two antennas (380) connected to the control unit (310), essentially comprises the following steps:

planning of the n number of communication in a manner that n number of user units (300) communicate among each other and where each of the user units (300) become a sink node once, and the other user units (300) simultaneously communicate towards the sink node (here, the plan is that each of the control units (310) that are present in each of the user units (300) records in the memory unit (305) when the n number of communications would take place, and when it is going to be a sink node), application of channel estimation via the channel estimation modules (325) that are present in the transmitting units (320), and the transmission of the channel state information ($h_n$) obtained by this operation to the memory unit (305) (here in order to estimate the channel state information ($h_n$) signal in the user units (300), pilot signal based or semi-blind channel estimation algorithms might be utilized), application of identity update by the identity update modules (330) that are present in each of the transmitting units (300) by way of receiving the channel state information ($h_n$) of each of the user unit (330) from the memory units (305), and recording the prime identity ($p_n$) obtained by this operation to the memory unit (305) (here, the identity update operation is an operation of producing a prime identity ($p_n$) the number of digits of which is dependent on the channel state information), according to the plan of the first step, applying the following steps n number of times where each user unit (300) becomes a sink node, receiving the channel state information ($h_n$) and the prime identity ($p_n$) belonging to the user unit (300) which is the sink node, from the memory unit (305) via the pre-processing module (335) that is present in the transmitting unit (320), and applying pre-processing (here, the pre-process is the calculation of $\varphi_n(\ )=(1/h_n)\ln(p_n)$ which is the pre-processing function), modulating the amplitudes of the signals that are generated by applying the pre-processing function ($\varphi_n$) to the amplitudes of the carrier signals by the modulation module (340) that is present in the transmitting unit (320), and transmitting it to the user unit (300) which is the sink node, receiving the said signals in the superposed state of the channel, via the antennas (380) in the user unit (300) which is the sink node, and demodulating them via the demodulation module (355) (here, the demodulated signal is $$Y = \sum_{n=1}^{N} h_n(1/h_n)\ln(p_n) + \omega,$$

and ω represents the Gaussian noise stemming from the thermal movements in the receiving unit (350)), applying a post-process to the said signal by the post-processing module of the receiving unit (350) (here, the post-process is the calculation of the post-processing function $\psi(Y)=e^Y$, "Y" is the signal to be demodulated, "e" is the Euler number), applying reconciliation and verification process by the reconciliation and verification module (365) on the receiving unit (350), and recording the shared secret key obtained by this process to the memory unit (305) (here, the reconciliation and verification process is defined as converting the output of the post-processing function ($\psi(Y)$) to a whole number and verify its divisibility by 2 and 3,
   if the result is positive, then indicating that there is a miscommunication or there is an attack on the system,
   if the result is negative, calculating the K=$\Pi p_n$ value, which is the shared secret key, by multiplying the output of the post-processing ($\psi(Y)$) by the prime identity ($p_n$) which is present in the memory unit (305)).

In another preferred embodiment of the invention, a method for unified identity authentication from n number of user units (300) towards a sink node which is a different user unit (300) than these said user units (300), over the multiple communication channel using the half-duplex communication mentioned in the other embodiment of the invention, essentially comprises the following steps:

application of channel estimation via the channel estimation modules (325) that are present in the transmitting units (320), and the transmission of the channel state information ($h_n$) obtained by this operation to the memory unit (305), application of identity update by the identity update modules (330) that are present in each of the transmitting units (300) by way of receiving the channel state information ($h_n$) of each of the user unit (330) from the memory units (305), and recording the prime identity ($p_n$) obtained by this operation to the memory unit (305) (here, the identity update operation is an operation of producing a prime identity ($p_n$) the number of digits of which is dependent on the channel state information ($h_n$) and recording this product in the memory unit (305)), receiving the prime identity ($p_n$), data to be transmitted ($A_n$), and channel state information ($h_n$) belonging to the sink node, from the memory unit (305) via the pre-processing module (335) that is present in the transmitting unit (320), and applying pre-processing (here, the pre-process is the calculation of $\varphi_n( )=((1/h_n)\ln(p_n)^{A_p}$ which is the pre-processing function), modulating the amplitudes of the signals that are generated by applying the pre-processing function ($\varphi_n$) to the amplitudes of the carrier signals by the modulation module (340) that is present in each of the transmitting units (320), and transmitting it to the user unit (300) which is the sink node, receiving the said signals in the superposed state of the channel, via the antennas (380) which are connected to the receiving unit (350) of the user unit (300) which is the sink node, and demodulating them via the demodulation module (355) (here, the demodulated signal is $$Y = \sum_{n=1}^{N} h_n(1/h_n)\ln\left((p_n)^{A_n}\right) + \omega,$$

and $\omega$ represents the Gaussian noise stemming from the thermal movements in the receiving unit (350)), applying a post-process to the said signal by the post-processing module of the said receiving unit (350) (here, the post-process is the calculation of the post-processing function $\psi(Y)=e^Y$, "Y" is the signal to be demodulated, "e" is the Euler number), applying reconciliation and verification process by the reconciliation and verification module (365) on the receiving unit (350), and recording the data belonging to the prime identities ($p_n$) obtained by this process to the memory unit (305) (here, the reconciliation and verification process is defined as converting the output of the post-processing function ($\psi(Y)$) to a whole number and verify its divisibility by 2 and 3,
   if the result is positive, then indicating that there is a miscommunication or there is an attack on the system,
   if the result is negative, then finding the $q_n^{e_i}$ value which can divide the output ($\psi(Y)$) of the post-processing function, and recording the $q_n$ values here as prime identities ($p_n$), and $e_i$ values as data belonging to the prime identities ($A_n$) in the memory unit (305)).

In a preferred embodiment of the invention, a method for each user unit (300) to generate a shared secret key, over a multiple-communication channel via single synchronous communication, using a full-duplex communication system (100) comprising n number of user units (300), essentially comprises the following steps:

application of channel estimation via the channel estimation modules (325) that are present in the transmitting units (320), and the transmission of the channel state information ($h_n$) obtained by this operation to the memory unit (305), application of identity update by the identity update modules (330) that are present in each of the transmitting units (300) by way of receiving the channel state information ($h_n$) of each of the user unit (330) from the memory units (305), and recording the prime identity ($p_n$) obtained by this operation to the memory unit (305) (here, the identity update operation is an operation of producing a prime identity ($p_n$) the number of digits of which is dependent on the channel state information ($h_n$), calculating the least common multiple ($h^*$) of the channel state information ($h_n$), and recording the prime identity ($p_n$) and the least common multiple ($h^*$) in the memory unit (305)), receiving the prime identity (pa) and the least common multiple ($h^*$) from the memory unit (305) via the pre-processing modules (335), and applying pre-processing (here, the pre-process is the calculation of $\varphi_n( )=(1/h^*)\ln(p_n)$ which is the pre-processing function), modulating signals that are generated by applying the pre-processing function ($\varphi_p$), to the amplitudes of the carrier signals by the modulation module (340), and transmitting it to the other user units (300), receiving the said signals in the superposed state of the channel, by the user unit (300), and demodulating them by cancelling the superposition via the demodulation module (355) (here, the demodulated signal is $$Y = \sum_{n=1}^{N-1} h_n(1/h^*)\ln(p_n) + \omega,$$

and $\omega$ represents the Gaussian noise stemming from the thermal movements in the receiving unit (350)), applying a post-process to the said signal by the post-processing module of the receiving unit (350) (here, the post-process is the calculation of the post-processing function $\psi(Y)=e^Y$, "Y" is the signal to be demodulated, "e" is the Euler number), applying reconciliation and verification process by the reconciliation and verification module (365) on the receiving unit (350), and recording the shared secret key obtained by this process to the memory unit (305) (here, the reconciliation and verification process is defined as converting the output of the post-processing function ($\psi(Y)$) to a whole number and verify its divisibility by 2 and 3, if the result is positive, then indicating that there is a miscommunication or there is an attack on the system, if the result is negative, multiplying the output ($\psi(Y)$) by the prime identity ($p_n$) which is present in the memory unit (305), then finding the $q_n^{e_i}$ value which can divide the said product, and recording the $q_n$ values here as prime identities ($p_n$) in the memory unit (305), and calculating the $K=\Pi p_n$ value of the shared secret key using these prime identities ($p_n$)).

The subject matter half-duplex communication system (100), full-duplex communication system (200) and methods used on these systems are explained in detail, supported by the accompanying figures.

The half-duplex communication system (100); in which the shared key generation or the integrated identity verification and data exchange methods can be used is shown in FIG. 1.

In the said shared key generation method used in the said half-duplex communication system; it is aimed that each of the n number of different user units (300) generates the same shared secret key. Here, the data transmission is from the n−1 different user units (300) towards the user unit (300) which is the sink node, and it is one-way. Via the n number of synchronous transmission where each user unit (300) is a sink node, each user unit (300) generates the same shared secret key. Differently from the present methods; in order for the wireless multiple access channel to function as a natural key, synchronous communication between the user units (300) over the same frequencies is established. By this way, the required time for n number of different user units (300) to generate a secret shared key drops to n units, and the frequency required for it drops to 1 unit.

Additionally, in the integrated authentication and data transfer method applied in the said half-duplex communication system (100), it is aimed that n−1 different user units (300) achieve data communication, in a secure manner, with the user unit (300) which is a sink node. Here, the data transmission is from the n−1 different user units (300) towards the user unit (300) which is the sink node, and it is one-way. Synchronous communication between the user units (300) over the same frequencies is established. By this way, the resources (time or frequency) needed for the n−1 different user units (300) to transmit data to the user unit (300) which is the sink node, drops from n−1 units to 1 unit. In the present method, additionally to the shared secret key generation method, data is loaded on top of the prime identities ($p_n$) which are selected from prime numbers. As a result of addition of the signals present in the logarithm inside the channel, the prime numbers would be distinguishable, like in the multiplication operation. For this reason, the data ($A_n$) on the exponent of the prime numbers could be separated in the sink node. This half-duplex communication system (100) is suitable to be used in wireless sensor networks.

In the wireless communication, channel, depending on the location of the user units (300), distance between the user units (300), time and other external factors, would distort all the signals. As used in the literature, this distortion is expressed with the channel state information ($h_n$) (channel coefficient (110), absorption coefficient). In other words, the signal transmitted by each of the user units (300) reaches the user unit (300) which is the sink node such that it is multiplied by the channel state information ($h_n$). For this reason, while designing the pre-processing and post-processing operation in the half-duplex communication system (100), the distorting effect of the channel is taken into account. Additionally, by the virtue of the signal unifying property of the communication channel, the user unit (300) which is the sink node would receive a single distorted and combined signal. Each user unit (300) needs channel estimation operation in order to remove the distorting effect of the channel.

The superposing property of the channel would cause all the data to be added as in mathematical illustration. This feature, which is seen as a source of noise in the traditional communication systems, is rendered advantageous as it outsources the processing load for the calculation of function over the channel, to the channel. However, in the traditional studies for calculating function over the channel, as the operations take place without using the prime identity ($p_n$), the proprietary values of the user units (300) are lost. By the virtue of the pre-processing function ($\varphi_n$) suggested with the inventive method, the data ($A_n$) taken to the exponent of the prime identity ($p_n$) keeps retaining their individual values even after the superposition feature of the channel is active.

Figure 2:
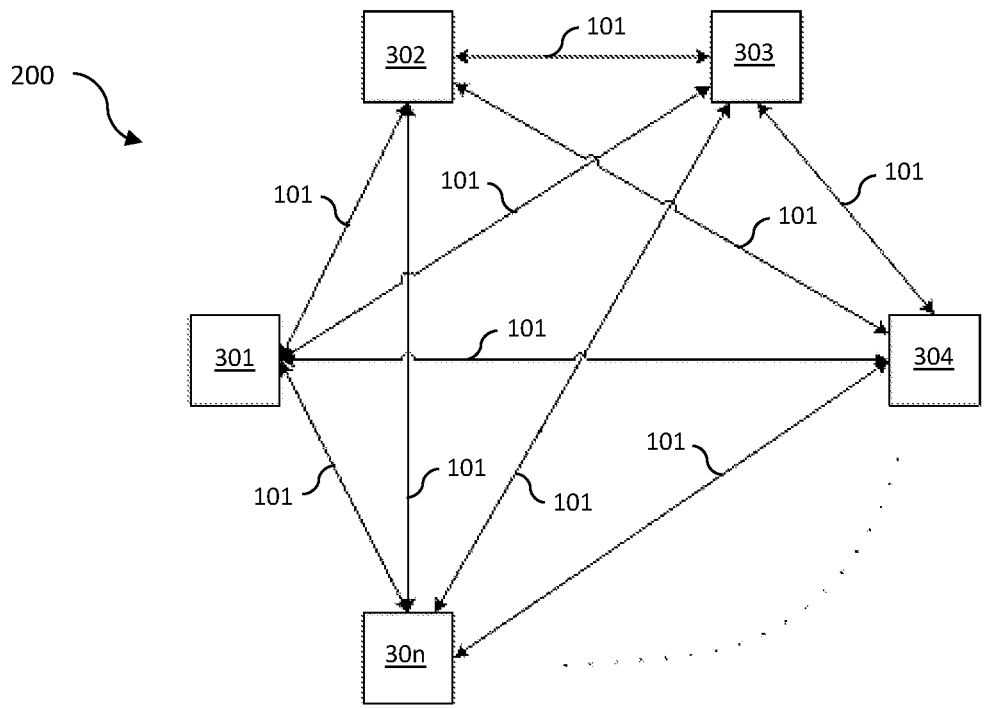
FIG. 2: Schematic view of the full-duplex communication system.

A full-duplex communication system (200) where the shared secret key generation method could be used more efficiently is shown in FIG. 2. In the inventive full-duplex communication system (200); it is aimed that n number of different user units (300) generate a shared secret key in a secure manner. It is realized in a manner that each user unit (300) synchronously broadcasts over the same frequency towards all of the other user units (300). By the virtue of this, the resources (time or frequency) required for all of the user units (300) to generate a shared secret key drops from n number of units to one unit.

In the full-duplex communication system (200), as in the half-duplex communication system (100), the channel, depending on the location of the user units (300), distance between the user units (300), time and other external factors, would distort all the signals, and because of the synchronous transmission, a single unified and distorted signal would reach the user units (300). For this reason, while designing the pre-processing and post-processing operation in the full-duplex communication system (200), the distorting effect of the channel is taken into account. However, since in the said full-duplex communication system (200) all of the user units (300) act as a sink node simultaneously, it would not be possible to cancel the distorting effect of the channel by pre-processing, as it is done in the half-duplex communication system (100). If the channel state information pertaining to any user unit (30) at a specific time is used in the pre-processing, the signal reaching to the user units (300) simultaneously eavesdropping would be distorted by a different channel distortion, and thus it would not cancel out. For this reason, differently from the half-duplex communication system (100), the distorting effect of the channel is not attempted to be compensated in the method applied in the said full duplex-communication system (200), instead, they are made distinguishable in the exponential of the private keys ($p_n$) by changing them to a natural number. In other words, even if it is not possible for the user unit (300) to cancel out the channel state information, which is different for each user unit (300), during the pre-processing, by using the least multiple of the channel state information, it is possible to distort the signal reaching each user unit (300) in the order of the natural number. The user units (300) need the channel estimation operation in order for the distorting effect of the channel to be distinguishable, as in the half-duplex communication system (100).

Figure 3:
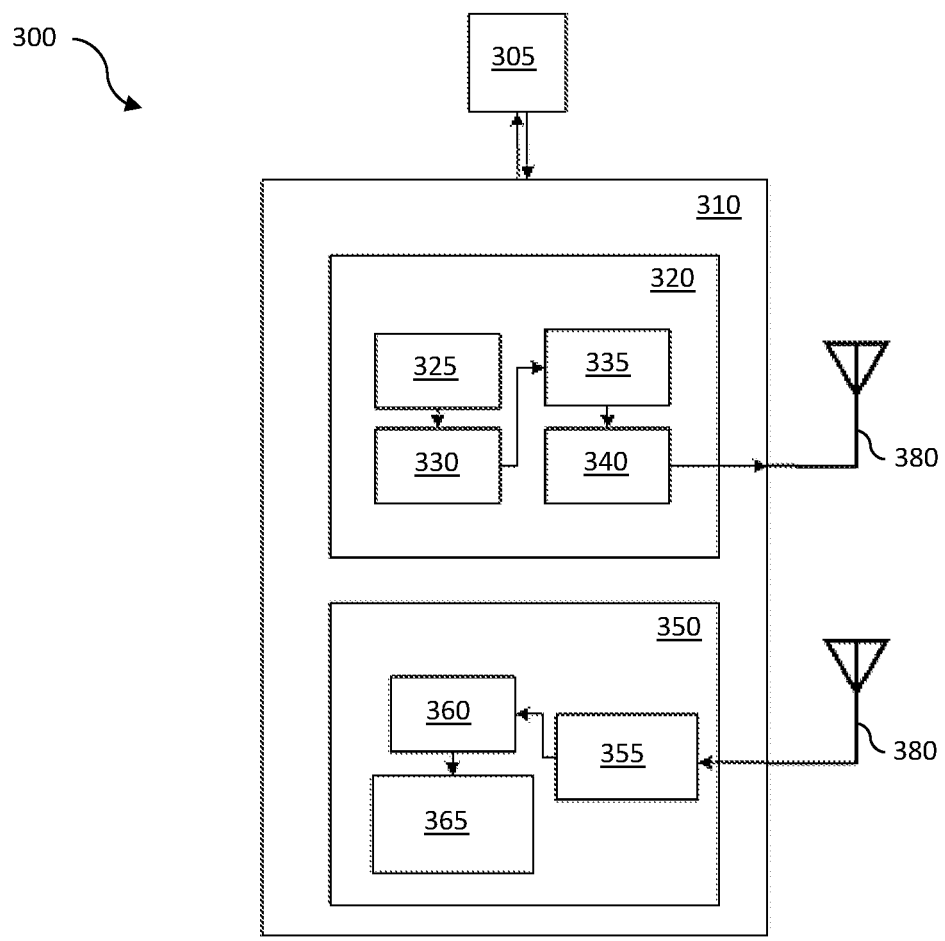
FIG. 3: Schematic view of the user unit.

FIG. 3 shows a user unit (350) comprising a control unit (310) for controlling the receiving unit (350) and the transmitting unit (320), memory unit (305), and two antennas (380) connected to the receiving unit (350) and the transmitting unit (320). In the transmitting unit (320) that is present in the user unit (300), channel estimation, identity update, pre-processing and modulation operations are carried out consecutively, and in the transmitting unit (350), demodulation, post-processing and reconciliation and verification operations are carried out consecutively. The communication between the user units (300) is enabled by the virtue of the antennas (380) connected to the transmitting unit (320) and the receiving unit (350). In the integrated authentication, shared key generation and data transfer method applied in the said half-duplex communication system (100), only the receiving unit (350) of the user unit (300) which is the sink node is operated, and only the transmitting unit (320) of the rest of the user units (300) is operated. In the shared key generation method applied in the full-duplex communication system (200), both the receiving units (35) and the transmitting units (320) of all the users operates at the same time. Additionally, the demodulation module (355) present in the said system (200) comprises the operations of cancelling out self-interference and demodulation. In the full-duplex communication, as the users might know the self-interference reaching the receiving unit, self-interference cancellation is possible, and it is used in the literature.

Figure 4A:
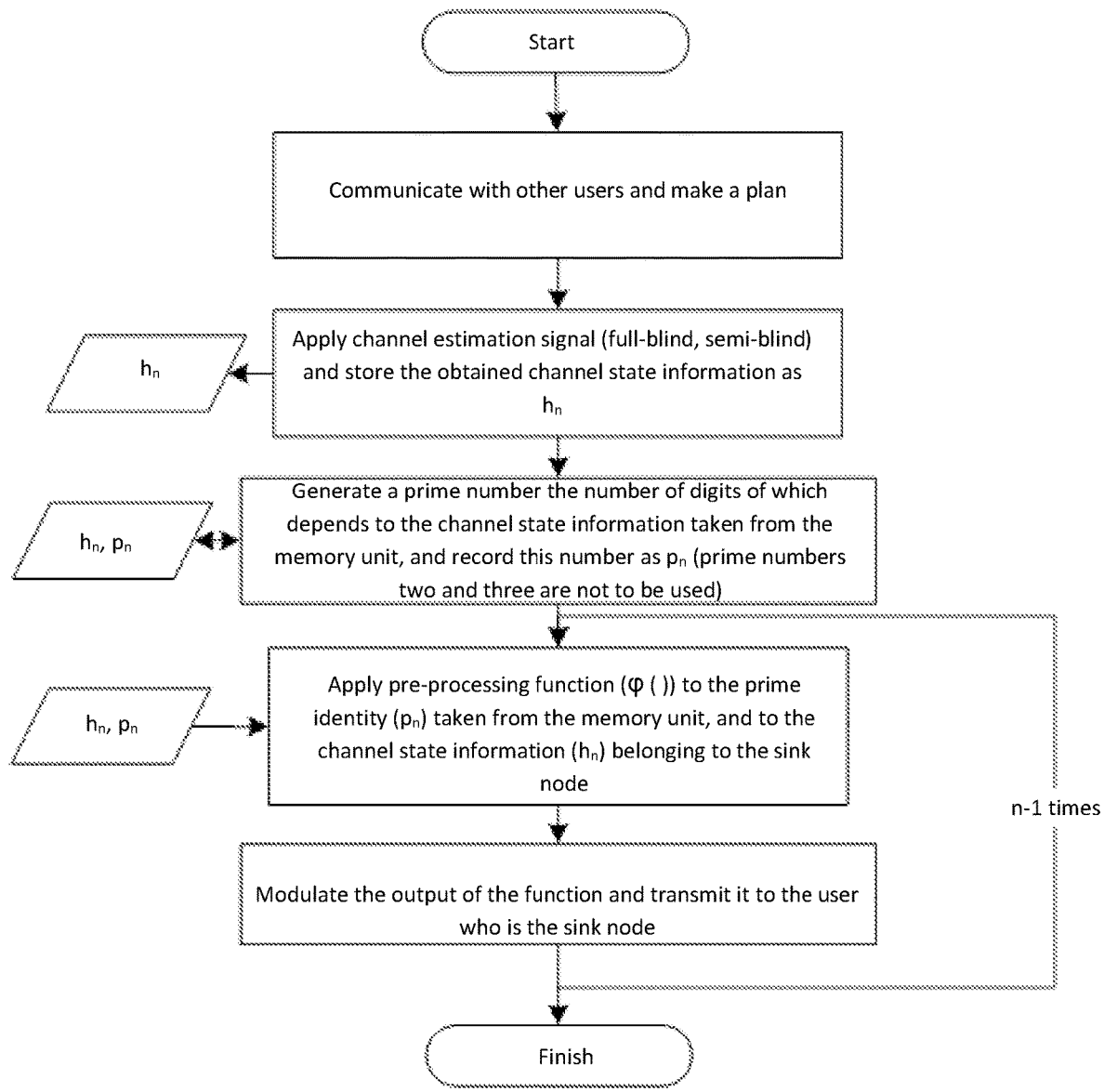
FIG. 4A: In the half-duplex communication system; the flow chart of the shared secret key production method, the steps of which that take place in the transmitting unit.

FIG. 4A shows the flow chart of the shared secret key generation method as utilized by the transmitting unit (320), and as utilized in the half-duplex communication system (100). In the first step of the method, the planning of the communication is carried out. In this step, which user unit (300) would be the sink node and in which order is determined in the synchronous communication having n number of user units (300) for traditional communication methods which are not secure, and the eavesdroppers could listen over the shared channel. In the next step, channel estimation is carried out by the channel estimation module (325) which is present in each user unit (300). Pilot signal-based channel estimation or semi-blind channel estimation algorithms might be utilized for channel estimation. In the case when the pilot signal-based channel estimation algorithm is used, each user unit (300) sends the pilot signals (which, the transmitting units (320) already know) to the other user units (300). As the transmitting units (320) know the pilot signals, they can estimate the channel state information between them and the other user units (300). While, semi-blind channel estimation is achieved by using together the full-blind (without using the channel information) channel information and pilot-based channel estimation algorithms. The channel state information ($h_n$) is estimated by the transmitting unit (320) with high precision, and in this case, calculating by the eavesdroppers using models would not yield the required precision.

In the next step, identity update operation is realized by the update module (330). A prime number generated through identity update operation by the control unit (310) which is present in the user units (300), is recorded in the memory units (305) of the user units (300) as the prime identity ($p_n$). In the identity update operation, taking into account the noise generated by the channel and the precision allowed by the hardware, for the generation of the prime identity ($p_n$), it is calculated in the case using which maximum number of digits would that prime identity ($p_n$) reach the user unit (300) that is the sink node, without being distorted. Using the information learned during the channel estimation, in the case of distortion acting up on the $m^{th}$ digit after the decimal point, a prime number less than the value of m/n could be used; here, n defines the number of user units (300).

In the next step, pre-processing operation is realized by the pre-processing module (335). The content of the pre-processing function used in this step is shown in Equation 1:

$$\varphi_n(x_n) = (1/h_n)\ln(p_n) \qquad \text{(Equation 1)}$$

The prime identity ($p_n$) the logarithm of which is taken in the pre-processing function ($\varphi_n$) is divided by the channel state information ($h_n$) and then the modulation stage comes up next for sending it to the receiving unit (350). The operation of dividing ($1/h_n$) by the channel state information ($h_n$) used in the function is mathematically simplified by the distortion that would be caused by the channel, and thus enabling the cluster that is carrying only the information $\ln(q_n)$ to reach the receiving unit (350) (Equation 2). As the signal sent from the transmitting unit (320) would be distorted exactly in the amount of the channel state information ($h_n$) in the location it reaches the user unit (300), in the signal obtained by eavesdropping in any other location, the distorting effect of the channel would not be simplified and thus it would be meaningless.

In the next step, modulation operation is realized by the modulation module (340). The output of the pre-processing function ($\varphi_n$) is assigned to the amplitudes of the signal in order to take advantage of the superposition property of the channel, and it is transferred to the user unit (300) which is the sink node. Afterwards, the pre-processing step and the modulation step are repeated n−1 times.

Figure 4B:
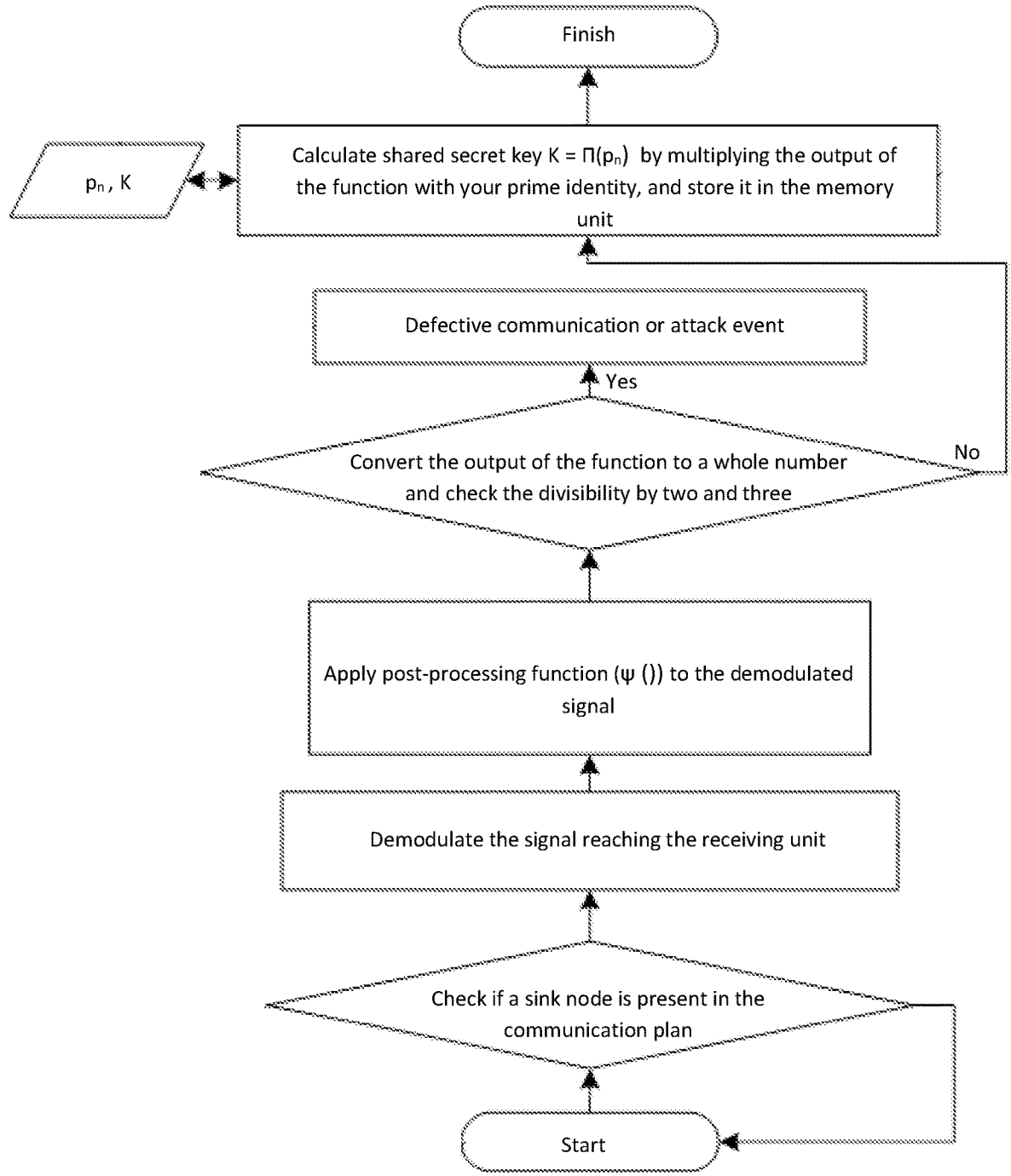
FIG. 4B: In the half-duplex communication system; the flow chart of the shared secret key production method, the steps of which that take place in the receiving unit.

FIG. 4B shows the flow chart of the shared secret key generation method as utilized by the receiving unit (350), and as utilized in the half-duplex communication system (100). In the first step, the user unit (300) checks if it is the sink node or not. In the case when it is the sink node, this method repeats in the receiving unit (350).

In the next step, demodulation operation is realized by the demodulation module (355). In this step, the signal reaching the antenna (380) is demodulated and the amplitude information of the carrying signal is transferred to the next step. As the result of the synchronous transmission of all the user units (300), the value in the Equation 2 given below would be obtained when the signal reaching the user unit (350) is demodulated:

$$Y = \sum_{n=1}^{N} h_n(1/h_n)\ln(p_n) \qquad \text{(Equation 2)}$$

By means of successful channel estimation (by means of pilot-based channel estimation or semi-blind channel estimation), the simplified state of the above-mentioned signal is as in Equation 3:

$$Y = \sum_{n=1}^{N} \ln(p_n) + \omega = \ln\left(\prod_{J}^{N}(p_n)\right) \qquad \text{(Equation 3)}$$

In the next step, post-processing operation is realized by the post-processing module (360). In this stage, the receiving unit (350) applies the post-processing function $\psi(Y)=e^Y$ to the demodulated signal, here "e" is the Euler number. After this post-processing function ($\psi(Y)$), the expression in the Equation 4 would be obtained in the receiving unit (350):

$$\psi(Y) = e^{\ln(\prod_{n=1}^{N}(p_n))} = \prod_{n=1}^{N}(p_n) \quad \text{(Equation 4)}$$

In the next step, reconciliation and verification operation is realized by the reconciliation and demodulation module (365). In this stage, verification of the information obtained by the post-processing function ($\psi(Y)$) is realized. The obtained value is converted to a whole number, and if this number is divisible by two and three, the next step is proceeded to. In this step, the method indicates that there is a defective communication or an attack. If a negative outcome is obtained in this step, then the next step is proceeded to. In this stage, the outcome of the post-processing function ($\psi(Y)$) which is converted to a whole number is expected to contain the multiplication of the prime identities ($p_n$) of all the user units (300) except the prime identity ($p_n$) of the user unit which is the sink node. By multiplying the outcome of the function by the prime identity ($p_n$) of the user unit (300) which is the sink node, shared secret key $K=\Pi(p_n)$ is obtained.

Figure 5A:
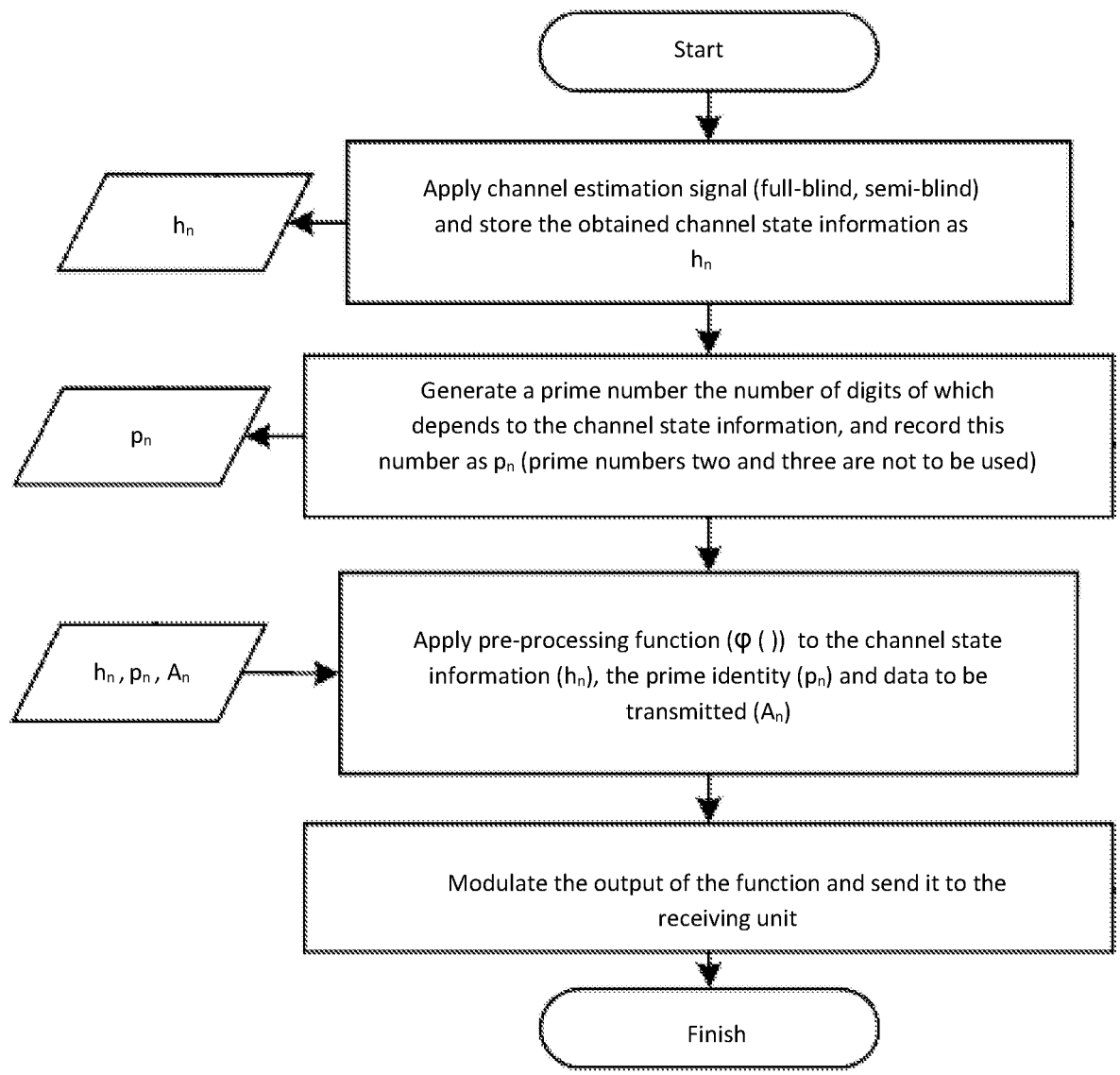
FIG. 5A: In the full-duplex communication system; the flow chart of the identity verification and data exchange method, the steps of which that take place in the transmitting unit.

FIG. 5A shows the flow chart of the integrated identity verification and data transfer method as utilized by the transmitting unit (320), and as utilized in the half-duplex communication system (100). In the first step of this method, channel estimation is carried out by the channel estimation module (325). In this stage, channel state information is obtained, and they are recorded in the memory unit (305). Afterwards, identity update operation is realized by the update module (330). In this stage, a prime identity (pn) is generated using channel state information.

In the next step, pre-processing operation is realized by the pre-processing module (335). The content of the pre-processing function used in this stage is shown in Equation 5:

$$\varphi_n(\ )=(1/h_n)\ln(p_n^{A_p}) \quad \text{(Equation 5)}$$

In addition to the shared secret key generation method, data ($A_n$) is added to the exponential of the prime identities ($p_n$) the logarithm of which are taken in the pre-processing function ($\varphi_n$).

In the next step, modulation operation is realized by the modulation module (340). In this step, the output of the pre-processing function ($\varphi_n$) is assigned to the amplitudes of the signal in order to take advantage of the superposition property of the channel, and it is transferred to the user unit (300) which is the sink node.

Figure 5B:
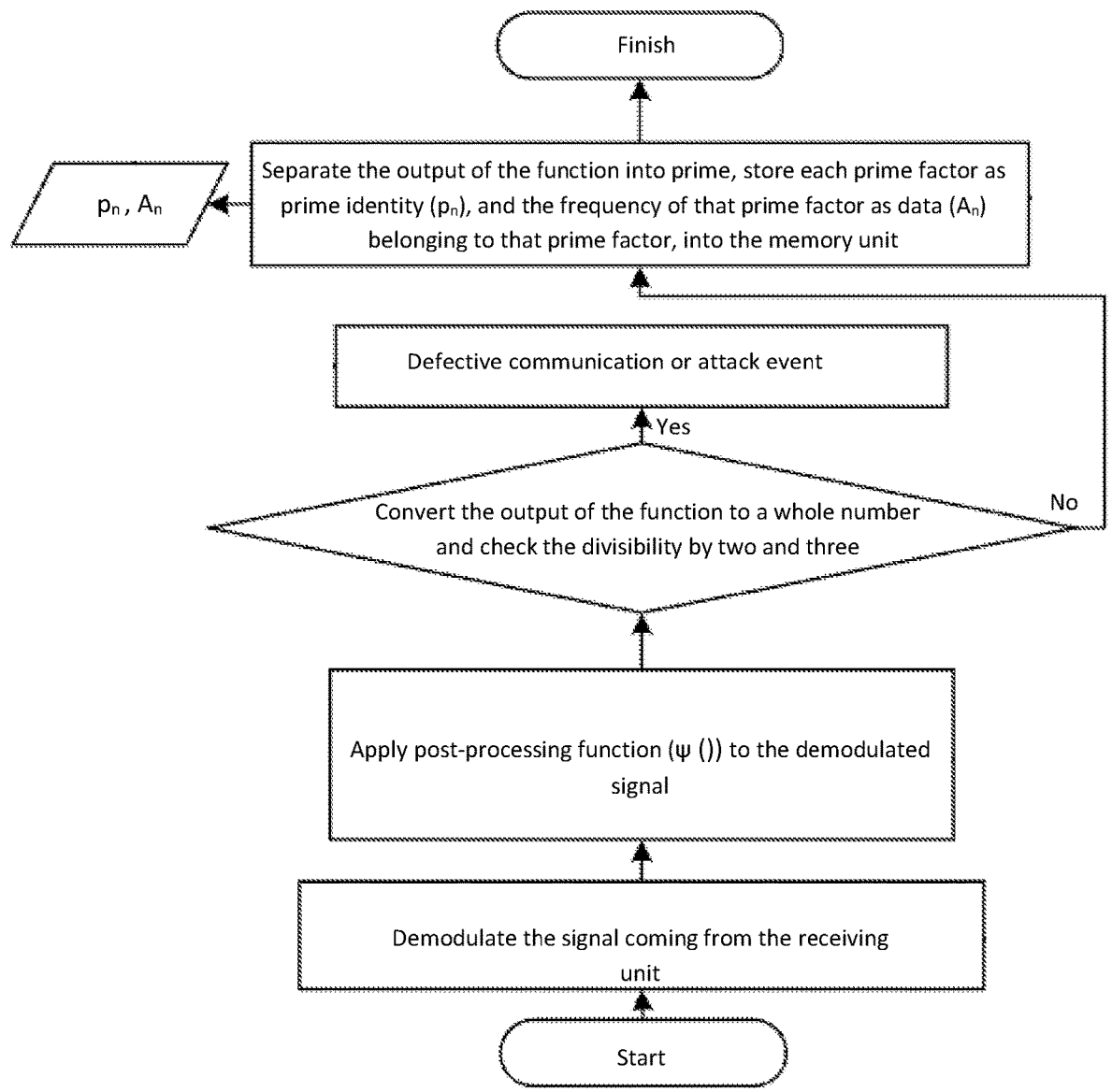
FIG. 5B: In the full-duplex communication system; the flow chart of the identity verification and data exchange method, the steps of which that take place in the receiving unit.

FIG. 5B shows the flow chart of the integrated identity verification and data transfer method as utilized by the receiving unit (350), and as utilized in the half-duplex communication system (100). In the first step of this method, demodulation operation is realized by the demodulation module (355). In this step, the signal reaching the antenna (380) is demodulated and the amplitude information of the carrying signal is transferred to the next step. As the result of the synchronous transmission of all the user units (300), the value in the Equation 6 given below would be obtained when the signal reaching the user unit (350) is demodulated:

$$Y = \sum_{n=1}^{N} h_n(1/h_n)\ln((p_n)^{A_n}) \quad \text{(Equation 6)}$$

By means of successful channel estimation (by means of pilot-based channel estimation or semi-blind channel estimation), the simplified state of the above-mentioned signal is as in follows:

$$Y = \sum_{n=1}^{N}\ln((p_n)^{A_n}) + \omega = \ln\left(\prod_{J}^{N}(p_n)^{A_n}\right)$$

In the next step, post-processing operation is realized by the post-processing module (360). In this stage, the receiving unit (350) applies the post-processing function $\psi(Y)=e^Y$ to the demodulated signal. After this post-processing function ($\psi(Y)$), the following expression would be obtained in the receiving unit (350):

$$\psi(Y) = e^{\ln(\prod_{n=1}^{N}(p_n)^{A_n})} = \prod_{n=1}^{N}(p_n)^{A_n} \quad \text{(Equation 8)}$$

In the next step, reconciliation and verification operation is realized by the reconciliation and demodulation module (365). In this stage, verification of the information obtained by the post-processing function ($\psi(Y)$) is realized. The obtained value is converted to a whole number, and if this number is divisible by two and three, it indicates that there is a defective communication or an attack. If it is determined that the said value is not divisible by two and three, then the $q_n^{e_i}$ value which can divide the output ($\psi(Y)$) of the post-processing function is found, and the $q_n$ values here are recorded as prime identities ($p_n$), and $e_i$ values are recorded as data belonging to the prime identities ($A_n$) in the memory unit (305).

Figure 6:
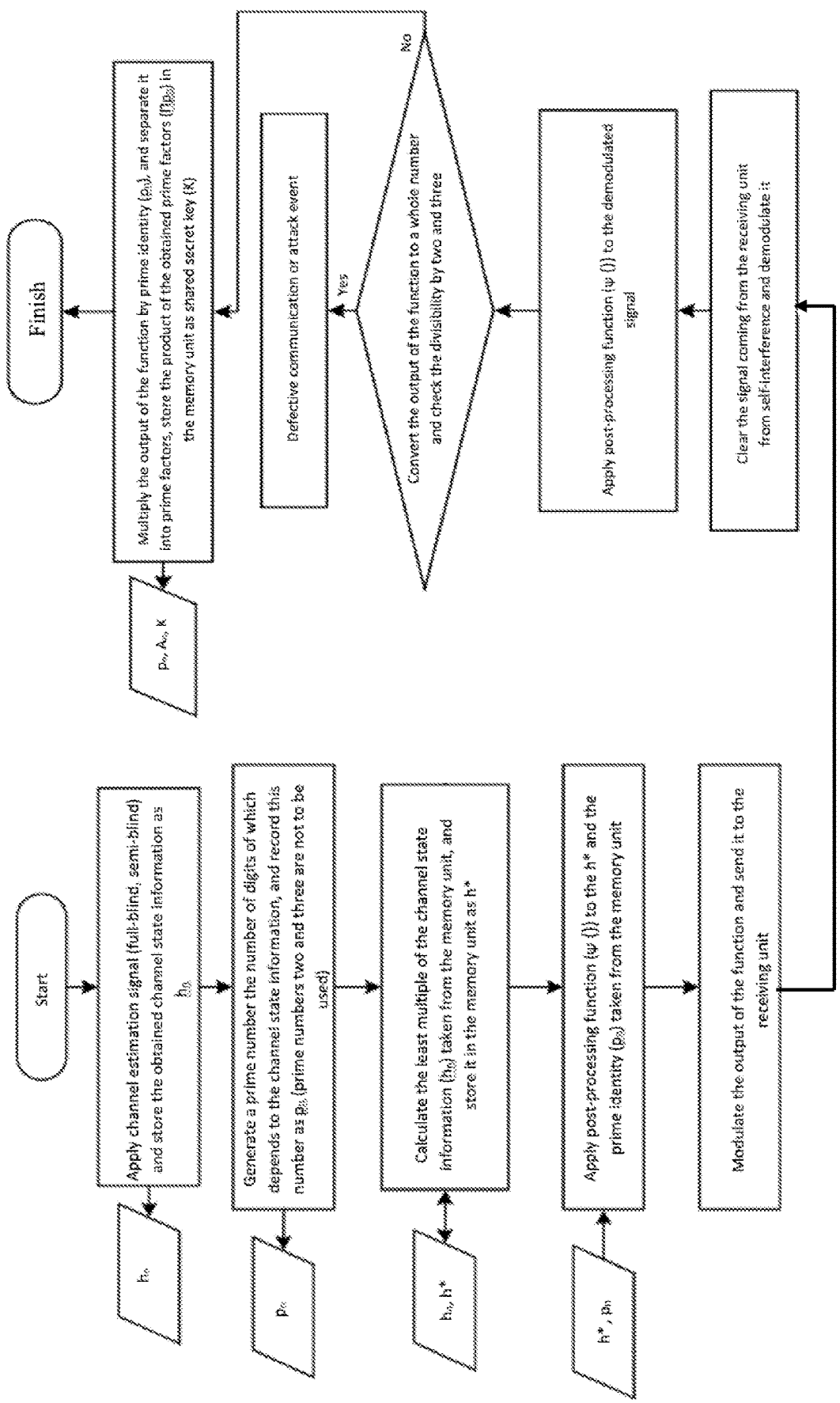
FIG. 6: In the full-duplex communication system; the flow chart of the shared secret key production method.

FIG. 6 shows the flow chart of the shared secret key generation method as utilized in the full-duplex communication system (200). In the first step of this method, channel estimation is carried out by the channel estimation module (325). The user units (300) obtains the channel state information ($h_n$) between them and the other user units (300). In the next step, identity update operation is realized by the update module (330). In this stage, the user unit (300) generates a prime identity ($p_n$), finds the least multiple ($h^*$) of the channel state information to be used in the pre-processing function, and stores it in the memory unit (305).

In the next step, pre-processing operation is realized by the pre-processing module (335). The content of the pre-processing function ($\varphi_n$) used in this stage is shown in Equation 9:

$$\psi_n(\ )=(1/h^*)\ln(p_n) \quad \text{Equation 9}$$

Here, $h^*$, $c_n$ are natural numbers verifying the expression $c_n=h_n/h^*$. Dividing the prime identities ($p_n$) the logarithm of which are taken, by the least multiple of channel state information ($1/h^*$) mathematically interacts with the distortion to be caused by the channel, and enables reaching the product ($c\ln(q_n)$) of the prime identities ($p_n$) of all user units (300) and a natural number c. As this situation would be present only on the channel between the user units (300), in the signal obtained by eavesdropping in any other location, the distorting effect of the channel would not be converted to a whole number and thus it would be meaningless.

In the next step, modulation operation is realized by the modulation module (340). The output of the pre-processing function ($\varphi_n$) is assigned to the amplitudes of the carrier signals in order to take advantage of the superposition property of the channel, and it is then transmitted to the other user units (300). In the next step, self-interference cancellation and demodulation operations are realized by the modulation module (355). The signal reaching the antenna (380) as a result of synchronously operating of all user units (300), receiving units (35) and transmitting units (320) contains the self-interference generated by the transmitting unit (320) belonging to the said user unit (300). The signal reaching the antenna (380) is cleaned of self-interference, demodulated and the amplitude information of the carrying signal is transferred to the next step. As the result of the synchronous transmission of all the user units (300), the value in the Equation 6 given below would be obtained when the signal reaching the user unit (350) of each user unit (300) is demodulated:

$$Y = \sum_{n=1}^{N-1} h_n(1/h^*)\ln(p_n) \quad \text{(Equation 10)}$$

The simplified state of the above equation is as follows.

$$Y = \sum_{n=1}^{N} c_n \ln(x_n) = \ln\left(\prod_{n=1}^{N}(p_n)^{c_n}\right) \quad \text{Equation 11}$$

As the last step here, a post-process is realized by the post-processing module (360). In this stage, the receiving unit (350) applies the post-processing function $\psi(Y)=e^Y$ to the demodulated signal. After this post-processing function ($\psi(Y)$), the following expression would be obtained in the receiving unit (350):

$$\psi(Y) = e^{\ln(\prod_{n=1}^{N}(q_n)^{c_n})} = \prod_{n=1}^{N}(p_n)^{c_n} \quad \text{(Equation 12)}$$

In the next step, reconciliation and verification operation is realized by the reconciliation and demodulation module (365). In this stage, the value obtained after the post processing function ($\psi(Y)$) is converted to a whole number, and if this number is divisible by two and three, it indicates that there is a defective communication or an attack. If it is determined that the said value is not divisible by two and three, then the output of the post-processing function ($\psi(Y)$) which is converted to a whole number is multiplied by the prime identity ($p_n$) belonging to the said user unit (300) which is present in the memory unit (305), and the $q_n^{e_i}$ values which can divide the result of the said multiplication are found, and the shared secret key $K=\Pi p_n$ is calculated using these $q_n$ values.

The invention claimed is:

1. A method for each user unit to generate a shared secret key by N+1 number of communications over a multiple access channel using a half-duplex communication system, wherein the half-duplex communication system comprises N+1 number of user units, wherein the N+1 number of user units comprise a transmitting unit of transmitting units, the transmitting unit comprises a channel estimation module of channel estimation modules, an identity update module of identity update modules and a modulation module; a receiving unit of receiving units, wherein the receiving unit comprises a demodulation module, a post-processing module and a reconciliation and verification module; a memory unit of memory units, wherein the memory unit is configured for storing prime identities ($p_n$), data to be transmitted ($A_n$) and the shared secret key (K); a control unit of control units; an antenna of antennas, wherein the antenna is connected to each transmitting unit and the receiving units; the method comprises the steps of:

planning of the N+1 number of communications in a manner, wherein the N+1 number of user units communicate among each other and wherein the each user unit becomes a sink node once, and remaining user units simultaneously communicate towards the sink node wherein each control unit present in the each user unit records in the memory unit when the N+1 number of communications takes place, and when the each user unit becomes the sink node;

applying a channel estimation via the channel estimation modules in the transmitting units, and a transmission of channel state information ($h_n$) the channel estimation to the memory unit, wherein n is a given user unit of the N+1 number of user units;

applying an identity update by the identity update modules by receiving the channel state information ($h_n$) of the each user unit from the memory units, and recording the prime identity ($p_n$) obtained by an identity update operation to the memory unit, wherein the identity update operation is an operation of producing the prime identity ($p_n$), a number of digits of the prime identity is dependent on the channel state information; and according to the planning step, applying the following steps N+1 number of times wherein the each user unit becomes the sink node;

receiving the channel state information ($h_n$) and the prime identity ($p_n$) belonging to the each user unit, wherein the each user unit is the sink node, from the memory unit via a pre-processing module, and applying a pre-processing, wherein the pre-processing is a calculation of a pre-processing function, wherein the pre-processing function is expressed as:

$\varphi_n(\ )=(1/h_n)\ln(p_n)$, modulating amplitudes of signals generated by applying the pre-processing function ($\varphi_n$) to amplitudes of carrier signals by the modulation module, and transmitting the signals to the each user unit, wherein the each user unit is the sink node, receiving the signals in a superposed state of the multiple access channel, via the antennas in the each user unit, wherein the each user unit is the sink node, and demodulating the signals via the demodulation module, wherein a demodulated signal is expressed as:

$$Y = \sum_{n=1}^{N-1} h_n(1/h_n)\ln(p_n) + \omega,$$

where $\omega$ represents a Gaussian noise stemming from thermal movements in the receiving unit, applying a post-process to the demodulated signal by the post-processing module, wherein the post-process is a calculation of a post-processing function, wherein the post-processing function is expressed as:

$\psi(Y)=e^Y$, where "Y" is a signal to be demodulated, "e" is an Euler number, applying a reconciliation and verification process by the reconciliation and verification module, and recording the shared secret key obtained by the reconciliation and verification process to the memory unit, wherein the reconciliation and verification process is converting an output of the post-processing function $\psi(Y)$ to a whole number and verify a divisibility of the whole number by 2 and 3, if a result is positive, then indicating there is a miscommunication or there is an attack on the half-duplex communication system, if the result is negative, calculating a K=Π$p_n$ value, wherein the K=Π$p_n$ value is the shared secret key, by multiplying the output of the post-processing function $\psi(Y)$ by the prime identity ($p_n$) present in the memory unit.

2. The method according to claim 1, wherein a synchronous communication between the N+1 number of user units over a same frequency is established.

3. The method according to claim 1, wherein a pilot signal-based channel estimation is utilized in the step of the channel estimation by the channel estimation module.

4. The method according to claim 1, wherein a semi-blind channel estimation is utilized in the step of the channel estimation by the channel estimation module.

5. A method for an integrated identity verification and a data transmitting method from N+1 number of user units towards a different user unit wherein the different user unit is a sink node, over a multiple access channel using a half-duplex communication system, wherein the half-duplex communication system comprises the N+1 number of user units, wherein the N+1 number of user units comprise a transmitting unit of transmitting units, wherein the transmitting unit comprises a channel estimation module of channel estimation modules, an identity update module of identity update modules and a modulation module; a receiving unit of receiving units, wherein the receiving unit comprises a demodulation module, a post-processing module and a reconciliation and verification module; a memory unit of memory units, wherein the memory unit is configured for storing prime identities ($p_n$), data to be transmitted ($A_n$) and a shared secret key (K); a control unit of control units; an antenna of antennas, wherein the antenna is connected to each transmitting unit and the receiving units; the method comprises the steps of:

applying a channel estimation via the channel estimation modules, and a transmission of channel state information ($h_n$) obtained by the channel estimation to the memory unit, wherein n is a given user unit of the N+1 number of user units;

applying an identity update by the identity update modules by receiving the channel state information ($h_n$) of each user unit from the memory units, and recording a prime identity of the prime identities ($p_n$) obtained by an identity update operation to the memory unit, wherein the identity update operation is an operation of producing the prime identity ($p_n$), a number of digits of the prime identity is dependent on the channel state information ($h_n$) and recording the prime identity in the memory unit;

receiving the prime identity ($p_n$), the data to be transmitted ($A_n$), and the channel state information ($h_n$) belonging to the sink node, from the memory unit via a pre-processing module, and applying a pre-processing, wherein the pre-process is a calculation of a pre-processing function, wherein the pre-processing function is expressed as:

$\varphi_n(\ )=((1/h_n)\ln(p_n)^{A_p}$;

modulating amplitudes of signals generated by applying the pre-processing function ($\varphi_n$) to amplitudes of carrier signals by the modulation module present in the each transmitting unit, and transmitting the signals to the each user unit, wherein the each user unit is the sink node;

receiving the signals in a superposed state of the multiple access channel, via the antennas connected to the receiving unit of the each user unit, wherein the each user unit is the sink node, and demodulating the signals via the demodulation module, wherein a demodulated signal is expressed as:

$$Y = \sum_{n=1}^{N-1} h_n(1/h_n)\ln((p_n)^{A_n}) + \omega;$$

where ω represents a Gaussian noise stemming from thermal movements in the receiving unit, applying a post-process to the demodulated signal by the post-processing module of the receiving unit, wherein the post-process is a calculation of a post-processing function, wherein the post-processing function is expressed as:

$\psi(Y)=e^Y$, where "Y" is a signal to be demodulated, "e" is an Euler number; and applying a reconciliation and verification process by the reconciliation and verification module on the receiving unit, and recording data belonging to the prime identities ($p_n$) obtained by the reconciliation and verification process to the memory unit, wherein the reconciliation and verification process is converting an output of the post-processing function $\psi(Y)$ to a whole number and verify a divisibility of the whole number by 2 and 3, if a result is positive, then indicating there is a miscommunication or there is an attack on the half-duplex communication system, if the result is negative, then finding a $q_n^{e_i}$ value, wherein the $q_n^{e_i}$ value divides the output $\psi(Y)$ of the post-processing function, and recording $q_n$ values here as the prime identities ($p_n$), and $e_i$ values as the data belonging to the prime identities ($A_n$) in the memory unit.

6. The method according to claim 5, wherein a synchronous communication between the N+1 number of user units over a same frequency is established.

7. The method according to claim 5, wherein a pilot signal-based channel estimation is utilized in the step of the channel estimation by the channel estimation module.

8. The method according to claim 5, wherein a semi-blind channel estimation is utilized in the step of the channel estimation by the channel estimation module.

9. A method for each user unit to generate a shared secret key by a single synchronous communication over a multiple access channel using a full-duplex communication system, wherein the full-duplex communication system comprises N+1 number of user units, wherein the N+1 number of user units comprise a transmitting unit of transmitting units, wherein the transmitting unit comprises a channel estimation module of channel estimation modules, an identity update module of identity update modules and a modulation module; a receiving unit of receiving units, wherein the receiving unit comprises a demodulation module, a post-processing module and a reconciliation and verification module; a memory unit of memory units, wherein the memory unit is configured for storing prime identities ($p_n$), data to be transmitted ($A_n$) and the shared secret key (K); a control unit of control units; an antenna of antennas, wherein the antenna is connected to each transmitting unit and the receiving units; the method comprises the steps of:

applying channel estimation via the channel estimation modules, and a transmission of channel state information ($h_n$) obtained by the channel estimation to the memory unit, wherein n is a given user unit of the N+1 number of user units;

applying an identity update by the identity update modules present in the each transmitting unit by receiving the channel state information ($h_n$) of the each of user unit from the memory units, and recording a prime identity ($p_n$) obtained by an identity update operation to the memory unit, wherein the identity update operation is an operation of producing the prime identity ($p_n$), a number of digits of the prime identity is dependent on the channel state information ($h_n$), calculating a least common multiple ($h^*$) of the channel state information ($h_n$), and recording the prime identity ($p_n$) and the least common multiple ($h^*$) in the memory unit;

receiving the prime identity ($p_n$) and the least common multiple ($h^*$) from the memory unit via pre-processing modules, and applying a pre-processing, wherein the pre-processing is a calculation of a pre-processing function, wherein the pre-processing function is expressed as:

$$\varphi_n(\ )=(1/h^*)\ln(p_n);$$

modulating signals generated by applying the pre-processing function ($\varphi_n$), to amplitudes of carrier signals by the modulation module, and transmitting the signals to other user units;

receiving the signals in a superposed state of the multiple access channel, by the each user unit, and demodulating the signals by cancelling a superposition via the demodulation module, wherein a demodulated signal is expressed as:

$$Y = \sum_{n=1}^{N-1} h_n(1/h^*)\ln(p_n) + \omega,$$

where $\omega$ represents a Gaussian noise stemming from thermal movements in the receiving unit;

applying a post-process to the demodulated signal by the post-processing module, wherein the post-process is a calculation of a post-processing function, wherein the post-processing function is expressed as:

$\psi(Y)=e^Y$, where "Y" is a signal to be demodulated, "e" is an Euler number; and applying a reconciliation and verification process by the reconciliation and verification module, and recording the shared secret key obtained by the reconciliation and verification process to the memory unit, wherein the reconciliation and verification process is converting an output of the post-processing function $\psi(Y)$ to a whole number and verify a divisibility of the whole number by 2 and 3, if a result is positive, then indicating there is a miscommunication or there is an attack on the full-duplex communication system, if the result is negative, multiplying the output of the post-processing function $\psi(Y)$ by the prime identity ($p_n$) present in the memory unit, then finding a $q_n^{e_i}$ value, wherein the $q_n^{e_i}$ value divides the output of the post-processing function, and recording $q_n$ values here as the prime identities ($p_n$) in the memory unit, and calculating a $K=\Pi p_n$ value of the shared secret key using the prime identities ($p_n$).

10. The method according to claim 9, wherein a synchronous communication between the N+1 number of user units over a same frequency is established.

11. The method according to claim 9, wherein a pilot signal-based channel estimation is utilized in the step of the channel estimation by the channel estimation module.

12. The method according to claim 9, wherein a semi-blind channel estimation is utilized in the step of the channel estimation by the channel estimation module.

* * * * *